Patented Apr. 27, 1954

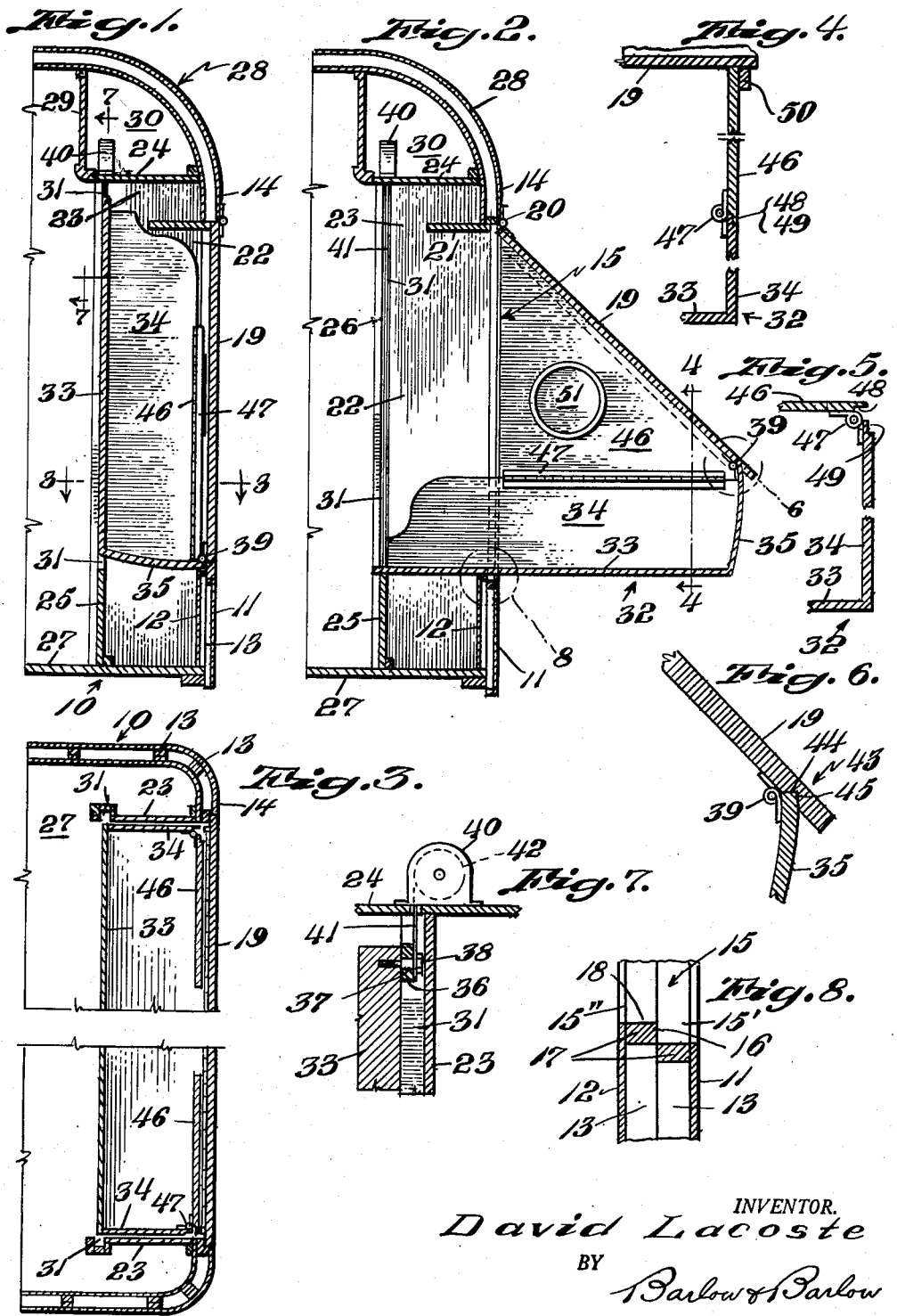

2,676,839

UNITED STATES PATENT OFFICE 2,676,839

FOLDING BED FOR TRAILER VEHICLES

David Lacoste, Cumberland Hill, R. I.

Application August 14, 1952, Serial No. 304,416

9 Claims. (Cl. 296—23)

1

This invention relates to a folding bed.

An object of the invention is to provide a folding bed so constructed as to provide for a compound swinging and linear movement to move the same from an upright position to a horizontal position of use.

Another object of the invention is to provide a folding bed so constructed and supported as to be adapted for use in a restricted area in which it is not desirable to have an open bed.

Another object of the invention is to provide a folding bed so constructed as to be partially suspended when in its position of use.

Another object of the invention is to provide a folding bed so constructed as to be completely enclosed when in its position of use.

Another object of the invention is to provide a folding bed and compartment therefor in which the bed will be suspended from one wall of the compartment and will provide a closure for the opposite side of said compartment when the bed is in the non-use position.

Another object of the invention is to provide a folding bed so constructed as to be particularly adapted for use in a trailer vehicle.

A more specific object of the invention is to provide a folding bed for a trailer vehicle in which said bed will project outwardly of an outer wall of the trailer body when in the position of use thereof.

With these and other objects in view, the invention consists of certain novel features of construction, as will be more fully described, and particularly pointed out in the appended claims.

In the accompanying drawings:

Fig. 1 is a vertical sectional view of one end portion of a trailer body illustrating one embodiment of my invention and with the bed portion in its upright position;

Fig. 2 is a similar view showing the bed portion thereof in the position of use;

Fig. 3 is a horizontal sectional view taken substantially along line 3—3 of Fig. 1, looking in the direction of the arrows thereon;

Fig. 4 is a sectional view on an enlarged scale taken substantially along line 4—4 of Fig. 2;

Fig. 5 is a similar view to Fig. 4 with certain parts shown in different relations to each other;

Fig. 6 is a sectional view on an enlarged scale of a fragmental portion at the location enclosed within the circle indicated 6 at the lower portion of Fig. 2;

Fig. 7 is a sectional view on an enlarged scale taken substantially along line 7—7 of Fig. 1; and Fig. 8 is a sectional view on an enlarged scale

2 of a fragmental portion at the location within the dotted circle indicated 8 at the lower portion of Fig. 2.

The invention in general is to provide a bed construction to be used in connection with an outer wall of a building wherein the bed when in the position of use will project for a major portion thereof outwardly of the wall and when in the position of non-use will occupy only so much space against said outer wall as is necessary for storing the bed within the said structure. Thus the space required within the structure will only be that required for storing said bed in the upright position. I also arrange for the bed to be moved in a path the inner end part of which is confined wholly within the space occupied by the bed within the structure when said bed is in the position of non-use or in the upright position thereof. The invention has particular application for use in a trailer vehicle wherein space is very limited.

In the drawing, I have shown the application of the invention as applied to a trailer vehicle, having a body 10 which may be of any conventional type of a metal or non-metal character. In the present instance the walls of the body are a laminated wood construction, the outer and inner sections, 11, 12, respectively, being properly supported and attached to a frame made of suitable uprights or ribs 13. In one of the walls of the body 10, as by way of example, the end wall 14, I make an opening 15 of a rectangular shape. The portion 15' of the opening 15 (see Figs. 1, 2, and 8) through the outer section 11 of the wall is made larger at the sides and lower edge thereof than the portion 15'' of the opening 15 extending through the inner section 12 so as to provide a shoulder 16 at the lower edge and sides of the said opening 15. The edges of the opening 15 are finished such as by means of blocks 17 to close the spaces between the ribs 13 at the said edges. The lower edge of the inner opening portion 15'' provides a rest 18 for a purpose to hereinafter appear.

A closure or door 19 for the opening 15 is hinged as at 20 to the wall 14 at the upper edge of the opening 15' to swing outwardly and the door 19 is of a size and thickness to engage against the shoulder 16 to extend flush with the outer wall section 11 when the door 19 is in the closed position. The upper inner edge of the door 19 abuts against the edge of a plate 21 which extends along the upper edge of the opening 15 to reinforce the said wall 14 at the said location. Thus, when the door 19 is in the closed position a tight seal is provided along the edges thereof. There is provided within the trailer body at the said opening 15 a compartment 22 having side walls 23, top wall 24, and a lower front wall section 25, the upper edge of which is at the same horizontal level as the rest 18. The front or inner side of the compartment 22 above the wall section 25 is left open as at 26 and the side walls 23 extend upwardly from the floor 27 of the trailer and substantially to the line of the wall section 25 extended. The top wall 24 is spaced from the roof 28 of the body 10 and a front wall section 29 extends from the said top wall 24 to the roof 28 and provides a storage chamber 30, the sides of which may be left open or closed as the choice may be. The chamber 30 may be used for the storage of bed clothes and the like.

The inner side of the inner marginal edge of each side wall 23 (see Fig. 7) has a rabbet formed therein to form a guide 31 extending the entire length of said side walls to open into the chamber 30.

A bed frame, designated generally 32, has a bottom wall 33, side walls 34, and an end wall 35. The end wall 35 is arched as shown (see Fig. 2) for a purpose which will hereinafter appear. The bed frame is of a width to be readily passed through the opening 15 and the bottom wall 33 thereof extends beyond the sides 34 (see Fig. 2). At each opposite edge of the projecting portion of the bottom wall 33, I pivotally mount thereon a guide block 36 as by means of a stud fastening 37 having a head 38. The block 36 may be made of any suitable material and I have found a wooden block treated in oil satisfactory. The block 36 extends to engage in the groove of the guide 31, thus slidably mounting one end of the bed frame 32 for vertical movement along said guides 31. The end wall 35 is hingedly mounted on the closure or door 19 at the lower marginal edge thereof as at 39 (see Fig. 6) and inwardly from the lower extremity of the end as shown. Thus mounting the other end of the bed to be carried by the said door 19 to swing therewith and also permit relative movement thereto. It will now be apparent that the bedframe 32 is mounted for a compound movement defined by the combined vertical and swinging movement thereof.

When the bed frame 32 is in its position of use (see Fig. 2) the same will extend generally horizontally into the open through the opening 15 to rest on the upper edge of the wall section 25 and the rest 18.

A counter balance device 40 (see Figs. 1, 2, and 7) of any known manufacture is provided to aid in lowering or raising the bed frame 32. There are two of these devices 40 and each is mounted on the wall 24 to be adjacent to a guide 31. In the present instance the device 40 is a spring type having a tape 41 wound about a drum 42 and extending therefrom into the groove of the guide 31 and the free end of the tape 41 is attached to the block 36 as by means of an opening in the tape through which the fastening 37 extends so as to clamp the tape 41 between the block 36 and the head 38 of the fastening 37. Thus the bed frame and door 19 are counterbalanced for any position thereof.

The bed frame 32 will normally remain in the used position without any locking means. However, such locking means may be provided if desired. In the present instance a latch and catch arrangement designated generally 43 is provided (see Fig. 6). This comprises a notch 44 made in the marginal lower edge of the door 19 at a position adjacent the hinge 39 outwardly thereof. This notch extends the entire width of the door and receives therein the upper extremity 45 of the wall 35 when the bed frame 32 is in the position of use. Thus the weight of the door 19 bears on the bed frame 32 in a direction tending to move the block 36 into engagement with a side wall of the groove of the guide 31. The notch 44 and said wall edge 45 also provides a seal at said location when the bed is in the position of use.

Since the bed extends outwardly of the enclosing wall, it is desirable that closures be provided for the side portion of the bed. To this end closures 46 are provided, one for each end of the bed, and are made to conform to the triangular shape of the end openings formed by the bed ends and the door 19 in the raised position (see Fig. 2). Each closure 46 is similar and is mounted on a side wall 34 of the bed frame 36 as by means of a piano hinge 47 so as to swing inwardly. The hinged edge of each closure 46 is rabbeted as at 48 (see Figs. 4, 5) to engage with a similar matching rabbet 49 provided in the said wall 34. Thus a seal is formed between the wall 34 and the closure 46 when in the closed position. There is also provided on the door 19 a depending lip 50 (see Fig. 4) against which the upper edge of the closure 46 abuts when in the closed position providing a seal at this location. A window 51 may be provided in one or each of the said closures 46 if desired.

In order to position the bed frame 32 from the non-use or upright position as shown in Fig. 1, the free end portion of the bed bottom 33 is grasped and pulled downwardly. This movement of the bed frame will cause the door 19 to swing outwardly and carry therewith the other end portion of the bed frame 32, the curvature of the wall 35 permitting ample clearance for the same to clear the lower edge of the opening 15 as carried therethrough.

Upon the bed bottom 33 reaching the lower end of its travel, the bed frame will project from said guides 31 substantially horizontally to rest or lie on said wall 25 and rest 18 with the major portion of the bed frame extending outwardly. The closure 46 may then be swung upwardly from the folded position shown in Fig. 1 to the position shown in Fig. 2 to engage against the lip 50, a lock (not shown) may be provided for locking said closures 46 in the open position. The mattress and bed clothes have not been shown but these may be arranged to be held in the bed frame 32 in any position thereof.

To return the bed frame to the non-use or upright position thereof, the bed bottom 33 is pushed upwardly along the guides 31 which will carry the door 19 therewith to the closed position as shown in Figs. 1 and 3, the bed bottom 33 providing a closure for the opening 26 of the compartment 22.

It may now be apparent that I have disclosed a novel folding bed construction which is particularly adapted for use in places wherein there is insufficient space for an open bed. I have described the bed and its storage compartment 22 as being built and made part of the trailer body. However, the storage compartment and the bed may likewise be built as a separate unit to be added to an existing structure, such as a porch or other places wherein such a bed may be desired.

I claim:

1. A folding bed comprising a housing having a wall provided with an opening, generally vertically disposed guides spaced from said wall and from each other, a hinged closure for said opening, a bed frame mounted at one end thereof on said closure for movement relative thereto and therewith when said closure is swung to and from said opening and said bed frame being secured at the other end portion thereof to said guides for movement along said guides, said bed frame in its position of use projecting from said guides generally horizontally through said opening and beyond said wall and, when in the upright position said closure covering said opening.

2. In combination a trailer body having an outer wall provided with an opening, a hinged closure for said opening, generally vertically disposed guides within said body spaced from said wall, a bed frame having one end thereof hingedly secured to the lower end of said closure for movement therewith and relative thereto and secured at its other end to the said guides for movement along said guides to move said bed frame to an upright position and to a generally horizontal position, said bed frame when in its position of use projecting from said guides generally horizontal to lie on the lower edge of said opening and extend beyond said wall, said closure providing a covering for the portion of said bed frame projecting beyond said wall.

3. In combination as set forth in claim 2, wherein said bed frame has hinged side closures for closing the sides of said bed frame extending beyond the said wall.

4. In combination as set forth in claim 2, wherein a counterbalance is provided for said bed frame.

5. In combination as set forth in claim 2 wherein said counterbalance is of a resilient type.

6. In combination a trailer body having an outer wall provided with an opening therethrough, a closure for said opening hinged along the upper edge thereof to the upper edge of said opening for swinging movement to and from said opening, a side wall extending inwardly from adjacent the side edges of said opening providing a compartment within said trailer body, said side walls each having a vertical groove at the inner edge providing spaced guides, a bed having a solid bottom, side walls and an end wall, said end wall being hingedly secured to the lower marginal edge of said closure for movement therewith and relative thereto, said bed being secured at the other end to said guides for movement along said guides whereby when said bed is in its position of use the same will project generally horizontally from said guides to lay and be supported on the lower edge of said opening and extend outwardly beyond said wall, and when moved to the upright position said bed will swing within the confines of said compartment and said closure will close said opening and said bed bottom will provide a closure for said compartment.

7. In combination as set forth in claim 6, wherein a latch and catch relation is provided for holding said bed in the use position.

8. In combination as set forth in claim 6 wherein side closures are provided for said portion of the bed extending outwardly of the said wall.

9. I combination, a trailer body having an outer wall provided with an opening, a hinged closure for said opening, vertically disposed guides at a position inwardly of said opening on opposite sides thereof, a rest extending between said guides, a bed frame having a bottom wall and having one end thereof hingedly secured to the lower end of the closure for movement with said closure and movement relative thereto and pivotally connected at its other end to said guides for movement along said guides to move said bed frame to an upright position and from an upright position to a generally horizontal position, said bed frame when in the horizontal position being supported at its inner end on said rest and suspended at the other end by said closure, and when said bed is in the upright position extending between said guides with the said bottom wall providing a closure for the space between said guides.

References Cited in the file of this patent
UNITED STATES PATENTS

| Number | Name | Date |
| --- | --- | --- |
| 408,171 | Gill | July 30, 1889 |
| 1,299,331 | Gydesen | Apr. 1, 1919 |
| 2,155,582 | Bond | Apr. 25, 1939 |
| 2,167,557 | Stout | July 25, 1939 |
| 2,355,340 | Strope | Aug. 8, 1944 |